US010114035B2

(12) United States Patent
Wang et al.

(10) Patent No.: US 10,114,035 B2
(45) Date of Patent: Oct. 30, 2018

(54) REMOTE WIND TURBULENCE SENSING (71) Applicant: NEC Laboratories America, Inc., Princeton, NJ (US)

(72) Inventors: Ting Wang, West Windsor, NJ (US); Yi Weng, Lafayette, LA (US)

(73) Assignee: NEC Corporation (JP)

( * ) Notice: Subject to any disclaimer, the term of this patent is extended or adjusted under 35 U.S.C. 154(b) by 386 days.

(21) Appl. No.: 14/978,934

(22) Filed: Dec. 22, 2015

(65) Prior Publication Data

US 2016/0202283 A1 Jul. 14, 2016

Related U.S. Application Data (60) Provisional application No. 62/101,076, filed on Jan. 8, 2015.

(51) Int. Cl.
| | |
|---|---|
| *G01P 5/26* | (2006.01) |
| *B64D 45/00* | (2006.01) |
| *G01W 1/10* | (2006.01) |
| *G01S 17/95* | (2006.01) |
| *G01S 17/58* | (2006.01) |
| *G01S 7/48* | (2006.01) |
| *G01S 7/481* | (2006.01) |
| *G01W 1/00* | (2006.01) |

(52) U.S. Cl.
CPC ............... *G01P 5/26* (2013.01); *B64D 45/00* (2013.01); *G01S 7/4802* (2013.01); *G01S 7/4814* (2013.01); *G01S 17/58* (2013.01); *G01S 17/95* (2013.01); *G01W 1/10* (2013.01); *B64D 2045/007* (2013.01); *G01W 2001/003* (2013.01); *Y02A 90/19* (2018.01)

(58) Field of Classification Search
CPC ...... G01S 17/89; G01S 7/4802; G01S 7/4814; G01N 2021/1793

See application file for complete search history.

(56) References Cited

PUBLICATIONS

Jaime A. Anguita, Joaquin Herreros, "Experimental analysis of orbital angular momentum-carrying beams in turbulence," Proc. SPIE 8162, Free-Space and Atmospheric Laser Communications XI, 816207 (Sep. 15, 2011); doi: 10.1117/12.892955 (Year: 2011).*

(Continued)

*Primary Examiner* — Luke D Ratcliffe
(74) *Attorney, Agent, or Firm* — Joseph Kolodka (57) ABSTRACT

Systems and methods for detection of atmospheric conditions using optical orbital angular momentum (OAM)-based spectroscopy include applying OAM states to a light beam to generate an OAM spectrum, transmitting OAM light beams into an atmosphere, and determining degradation of the generated OAM light beams passing through atmospheric turbulence. A rotation rate of aerosols in the atmosphere is determined by analyzing different frequency shifts in OAM states of OAM light beams. A reflected OAM spectrum including a plurality of OAM light beams associated with the aerosols in the atmosphere may be received, and Doppler frequency shifts caused by reflection off the aerosols in the atmosphere may be measured. Laguerre-Gaussian (LG) modes of the received light beams may be detected and sorted based on the OAM states of the LG modes, and wind turbulence values are predicted by analyzing a difference in the Doppler frequency shifts for the received OAM light beams.

20 Claims, 7 Drawing Sheets

(56) References Cited

PUBLICATIONS

Cvijetic, et al., "Detecting Lateral Motion using Light's Orbital Angular Momentum", Scientific Reports, Oct. 2015, pp. 1-7.

Frehlich, "Effects of Wind Turbulence on Coherent Doppler Lidar Performance", Journal of Atmospheric and Oceanic Technology, American Meteorological Society, Feb. 1997, pp. 54-75.

Huffaker, et al., "Remote Sensing Velocities Using Coherent Laser of Atmospheric Wind Solid-state and CO2 Systems", Proceedings of the IEEE, Feb. 1996, pp. 181-204, vol. 84, No. 2.

Kaimal, et al., "Atmospheric Boundary Layer Flows: Their Structure and Measurement", Journal of Atmospheric and Terrestrial Physics, 1995, pp. 1357, vol. 57, No. 11.

Kameyama, et al., "Compact All-fiber Pulsed Coherent Doppler Lidar System for Wind Sensing", Applied Optics, Apr. 2007, vol. 46, No. 11, pp. 1953-1962.

Lavery, et al., "Refractive Elements for the Measurement of the Orbital Angular Momentum of a Single Photon", Optics Express, Jan. 2012, pp. 2110-2115, vol. 20, No. 3.

Mair, et al., "Entanglement of the Orbital Angular Momentum States of Photons", Nature, Jul. 2001, pp. 313-316, vol. 412.

Rahm, et al., "Aircraft Wake Vortex Measurement with Airborne Coherent Doppler Lidar", Journal of Aircraft, Jul. 2008, pp. 1148-1155, vol. 45, No. 4.

Spuler, et al., "Optical Fiber-based Laser Remote Sensor for Airborne Measurement of Wind Velocity and Turbulence", Applied Optics, Feb. 2011, pp. 842-851, vol. 50, No. 6.

Uhlhorn et al., "Verification of Remotely Sensed Sea Surface Winds in Hurricanes", American Meteorological Society, Jan. 2003, pp. 99-116, vol. 20.

Weitkamp, "Lidar Range-Resolved Optical Remote Sensing of the Atmosphere", Springer Series in Optical Sciences, Copyright 2005, pp. 1-467, vol. 1.

Weng, et al., "Few-Mode Distributed Optical Fiber Sensors", Advanced Photonics, Jun. 2015, pp. 1-3.

Weng, et al., "Biomedical Photoacoustic Imaging Sensor based on Orbital Angular Momentum Multiplexing", Advanced Photonics, Jun. 2015, 1 page.

Winzer, "Making Spatial Multiplexing a Reality", Nature Photonics, May 2014, pp. 345-348, vol. 8.

Yao, et al., "Orbital Angular Momentum: Origins, Behavior and Applications", Advances in Optics and Photonics, May 2011, pp. 161-204.

* cited by examiner

REMOTE WIND TURBULENCE SENSING

RELATED APPLICATION INFORMATION

This application claims priority to provisional application No. 62/101,076 filed Jan. 8, 2015, the contents of which are incorporated herein by reference.

BACKGROUND

Technical Field

The present invention relates generally to wind turbulence sensing, and more particularly, to a system and method for remote wind turbulence sensing using Orbital Angular Momentum (OAM) Light Detection and Ranging (LIDAR).

Description of the Related Art

Recently, aircraft safety is becoming an increasingly important issue in light of accidents and incidents over the past several decades. For example, when flying through the atmosphere, a plane is continually subject to various aerial effects, and an abrupt change in the atmosphere (e.g., wind turbulence) may cause an aircraft to have an incident (e.g., airplane crash). Wind turbulence is a random, chaotic motion of air that can structurally damage the plane and injure its passengers, and may be caused by changes in air currents. Generally, there is at least dust, water droplets, pollution, pollen, and/or salt crystals in the atmosphere. Wind shear is a micro-scale meteorological phenomenon over a relatively small distance in the atmosphere, which may produce severe weather (e.g., tropical cyclone).

These atmospheric conditions (e.g., wind turbulence, wind shear) can pose serious hazards to aerial navigation. Therefore, information of the atmospheric turbulence imposing on free-space communication channels may be significant for optical system design operating in such an environment. If the pilot can have prior knowledge of wind shear, down burst, or clear air turbulence, then airline safety may be improved. For example, the pilot can direct the aircraft in such a manner to evade wind turbulence so that fierce aircraft body movements are reduced. Furthermore, the passengers can be alerted in advance regarding the upcoming wind turbulence by means of a communication to ease conceivable panic.

Conventionally, remotely sensing air turbulence (e.g., wind shear, wind turbulence, etc.) in navigable airspace has been attempted by, for example, using coarse interference filters with wide spectral bandwidth to isolate spectral regions with weak absorption to obtain range information. However, since the coarse interference filters mass many spectral lines and transmit spectral lines of interfering gases, such as water vapor and ozone, whose concentrations were unknown and variable, precise range information could not be obtained.

A tunable Fabry-Perot etalon has been used for remote sensing of wind turbulence, and may include double-pulsed, visible or near-infrared sources, and direct detection. The spatial temperature profile ahead of an aircraft is detected by continually sensing the intensity of the thermal radiation from the column of atmospheric air, and comparing the relative intensity of the spectral peaks over time to achieve wind turbulence prediction. Such devices also require large, cumbersome, expensive transmitters, they are susceptible to interference by smoke, dust and fog as well, and require complex electronic systems to interpret the received signals.

A speckle-turbulence system has also been employed, and may include crossed beams and multiple detectors for achieving wind turbulence remote sensing. The advantage of a speckle-turbulence system is the ability to measure the vector wind in a plane perpendicular to the line of sight, but this also greatly complicates the system. Furthermore, the continuous wave speckle-turbulence system has to use a hard target, such as the earth or a building, so it cannot be operated with an aerosol-like target. In other words, pertaining to some wind shear warning devices mounted ahead of the aircraft, not only is awareness delayed and a warning hastily emitted without prior notice, but it is also impossible to confirm whether this warning is dependable or not using conventional systems and methods.

SUMMARY

A transmitter using optical orbital angular momentum (OAM)-based spectroscopy for detection of atmospheric conditions, including at least one OAM generator configured to apply at least one OAM state on a light beam to generate an optical OAM spectrum including a plurality of OAM states. A transmitting device is configured to send one or more generated OAM light beams into an atmosphere. One or more measurement devices are configured to determine degradation of the generated OAM light beams when passing through atmospheric turbulence and to determine a rotation rate of aerosols in the atmosphere by analyzing different frequency shifts in the plurality of OAM states.

A receiver using optical orbital angular momentum (OAM)-based spectroscopy for detection of atmospheric conditions, including a measurement device for determining Doppler frequency shifts caused by reflection off aerosols in an atmosphere for a plurality of received light beams with OAM states. An OAM sorter is configured to detect and sort a plurality of orthogonally decoded Laguerre-Gaussian (LG) modes of the received light beams based on the OAM states of the LG modes. An analysis device generates predictions of three-dimensional wind turbulence values by analyzing a difference in the Doppler frequency shifts for the plurality of received light beams with OAM states.

A method for detection of atmospheric conditions using optical orbital angular momentum (OAM)-based spectroscopy includes applying OAM states to a light beam to generate an OAM spectrum, transmitting OAM light beams into an atmosphere, and determining degradation of the generated OAM light beams passing through atmospheric turbulence. A rotation rate of aerosols in the atmosphere is determined by analyzing different frequency shifts in OAM states of OAM light beams. A reflected OAM spectrum including a plurality of OAM light beams associated with the aerosols in the atmosphere may be received, and Doppler frequency shifts caused by reflection off the aerosols in the atmosphere may be measured. Laguerre-Gaussian (LG) modes of the received light beams may be detected and sorted based on the OAM states of the LG modes, and wind turbulence values are predicted by analyzing a difference in the Doppler frequency shifts for the received OAM light beams.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to systems and methods for sensing wind turbulence using Doppler Orbital Angular Momentum (OAM) Light Detection And Ranging (LIDAR). In a particularly useful embodiment, the present principles may be employed to utilize vortex beams to significantly increase the information that can be obtained from backscatter OAM LIDARs. A significant advantage of the Doppler system is that path resolved wind may be readily and easily obtained. Such sensor devices can be utilized (e.g., positioned) on, for example, an operating aircraft to provide early warning of clear air turbulence or wind shear.

For example, a sensor may be placed on the nose of aircraft, allowing the detection of rotation within the atmosphere, thereby alerting the crew of the aircraft (or other people or systems) to prepare for potentially damaging winds. In one embodiment, the present principles may be employed to achieve remote precise passive detection to provide early warning to aircraft (e.g., planes, helicopters, drones, etc.) of clear air turbulence and wind shear conditions.

In one embodiment, by using optical heterodyne detection according to the present principles, lower optical power may be utilized as compared to conventional systems and methods. Since the Doppler-shifted frequency is directly proportional to line-of-sight velocity, the wind speeds obtained by an OAM LIDAR instrument may not need calibration according to the present principles. In some embodiments, continuous wave (CW) or pulsed beams may be used as the transmitter source, which may enhance portability and reliability.

In some embodiments, bonding the OAM components made the system compact, portable, and robust. Other advantages over conventional systems include better penetration of smoke, dust, and/or fog than a visible laser, stable output power, and low beam pointing jitter because of the use of an optical heterodyne detector. Consequently, the system according to the present principles may be ground installed at an airport (in addition to attached/installed on an aircraft) to determine temperature gradient changes and wind shear along the paths of approaching or departing aircraft. Thus, the OAM LIDAR wind turbulence measurement system according to the present principles may be employed for a plurality of purpose, including, for example, aircraft safety, military helicopters, airport ground security, etc.

It should be understood that embodiments described herein may be entirely hardware or may include both hardware and software elements, which includes but is not limited to firmware, resident software, microcode, etc. In a preferred embodiment, the present invention is implemented in hardware. The present invention may be a system, a method, and/or a computer program product. The computer program product may include a computer readable storage medium (or media) having computer readable program instructions thereon for causing a processor to carry out aspects of the present invention.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
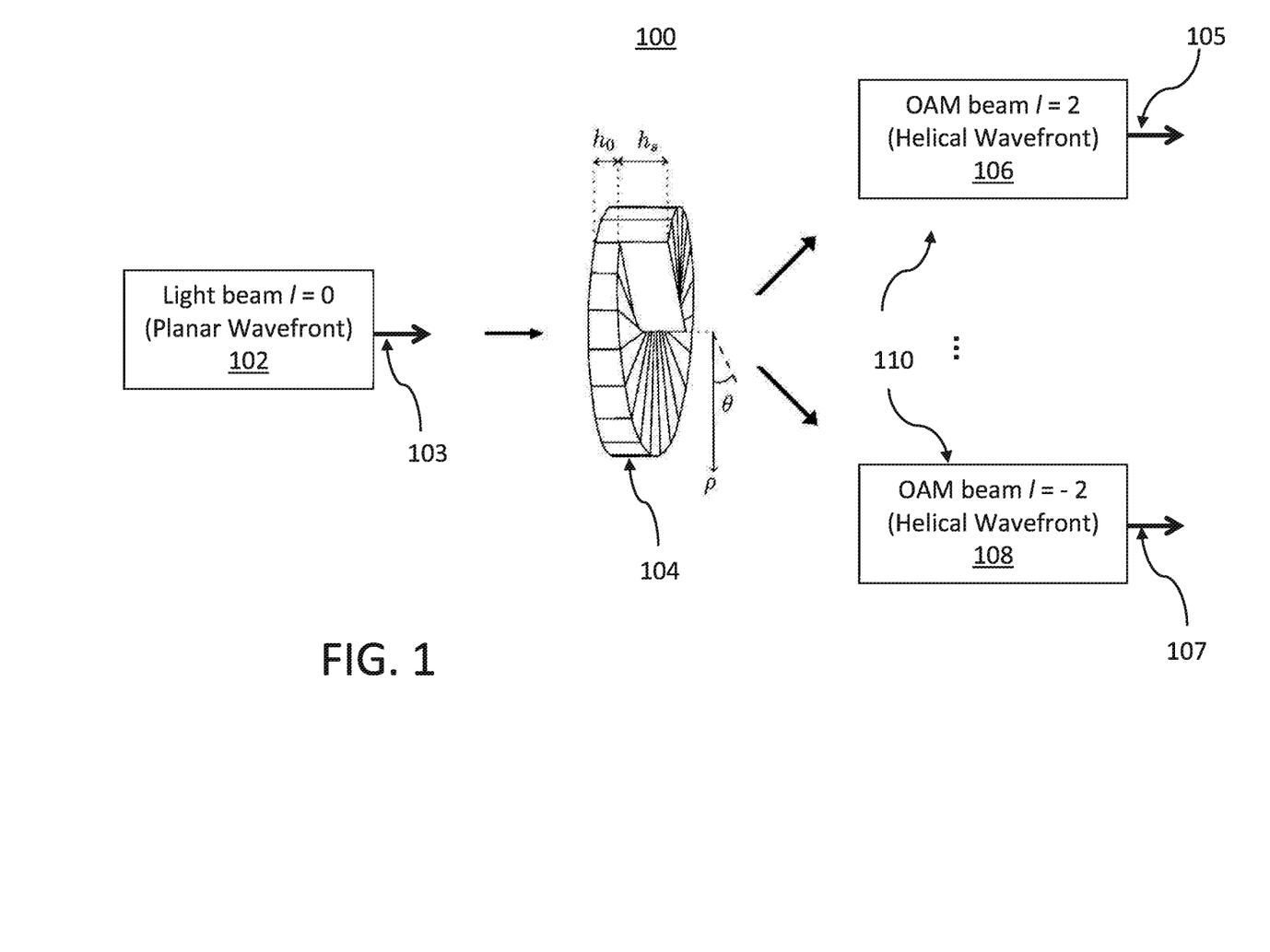
FIG. 1 shows an exemplary Orbital Angular Momentum (OAM) mode generator, in accordance with an embodiment of the present principles.

Referring now to the drawings in which like numerals represent the same or similar elements and initially to FIG. 1, an exemplary high-level diagram of an Orbital Angular Momentum (OAM) mode generator 100 (e.g., using a spiral phase plate 104) is illustratively depicted in accordance with an embodiment of the present principles.

In one embodiment, the present principles may be employed to generate light beams 106, 108 (e.g., vortex beams) with OAM modes and/or vortex beam spectrums 110 with OAM modes by crossing a light beam 102 (e.g., laser beam) from a light source device (not shown) across a spiral phase plate (SPP) 104 with an inhomogeneous thickness. The beams 102, 106, 108 may include an axis of travel 103, 105, 107 in the center of the beams 102, 106, 108, respectively. The optical vortex beams 106, 108 may include light twisted (e.g., corkscrew shaped) around their axis of travel 105, 107, and if projected onto a flat surface, the optical vortex may appear as a ring of light with a dark hole in the center.

In some embodiments, the vortex beams 106, 108, 110 may interact with the atmosphere in a different manner than the original light beam and/or other vortex beams according to various embodiments, thereby improving overall LIDAR performance of the wind turbulence prediction system according to the present principles. In some embodiments, beams carrying OAM modes may also be generated using, for example, Pitch-Fork Hologram (PFH), Q-Plate and/or cylindrical mode converters according to the present principles.

In one embodiment, the OAM generator 100 may be configured to receive the light beam 102 as input, and may generate at least one OAM state on the light beam 102 to generate one or more OAM light beams 106, 108, and, in a further embodiment, an optical OAM spectrum 110. In an embodiment, the OAM generator 100 may apply OAM states on the light beam to generate an optical OAM spectrum 110 associated with a remote object (not shown), wherein the optical OAM spectrum 110 may provide lateral motion information and/or high resolution imaging information of a remote object.

For example, OAM states on light beams may include Bessel light beams, Laguerre-Gaussian light beams, optical fiber modes, superpositions of Bessel light beams or Laguerre-Gaussian light beams that have the same OAM phase number as described below. In particular, light's spatial modes with complex amplitude described by the phase factor $\exp(il\theta)$ are known as its OAM modes, where $l=0, \pm 1, \pm 2, \ldots$, and $\theta$ is the cylindrical coordinate. In one embodiment, the OAM generator 100 may apply arbitrary non-zero ($l \ne 0$) OAM states on the light beam 102 of a light source, where $l$ denotes the OAM phase number and/or OAM state number.

Light beams that carry non-zero OAM states may be defined as being in a helical mode 106, 108, which may be characterized by a wave front including a helix shape with an optical vortex in the center at the beam axis 105, 107. When the OAM state is zero (e.g., $l=0$), for example, the light beam does not bear OAM (e.g., 102), and accordingly is not helical and has a constant phase across the mode. According to the present principles, both the zero (e.g., $l=0$) and non-zero (e.g., $l \ne 0$) OAM modes and cases are supported.

In various embodiments, the optical OAM generator 100 may include a spatial light modulator (SLM), Q-phase plates, an OAM sorter, fiber-optic methods (e.g., generating an OAM mode in an optical fiber), integrated silicon photonics methods without loss of generality, etc. For example, a spatial light modulator (SLM) may include a device configured to impose spatially varying modulation on a beam of light, such as a modulation on the intensity and/or phase of a beam of light. In another Q-phase plates may include a liquid crystal cell having a thickness and/or birefringence selected to induce a birefringent phase at the wavelength for light propagation and may be employed to cause, for example, interaction between the spin angular momentum and orbital angular momentum according to the present principles.

In one embodiment, measurement of wind speed may take place on the surface of a cone where the depth changes as a function of the focus distance. When light is scattered from a spinning object, the degradation of a transmitted beam (e.g., 106), passing through atmospheric turbulence, and the rotation rate of the object can be measured by analyzing different frequency shifts in the OAM states of the light to, for example, remotely predict and/or sense wind turbulence, according to various embodiments of the present principles, which will be described in further detail herein below.

Figure 2:
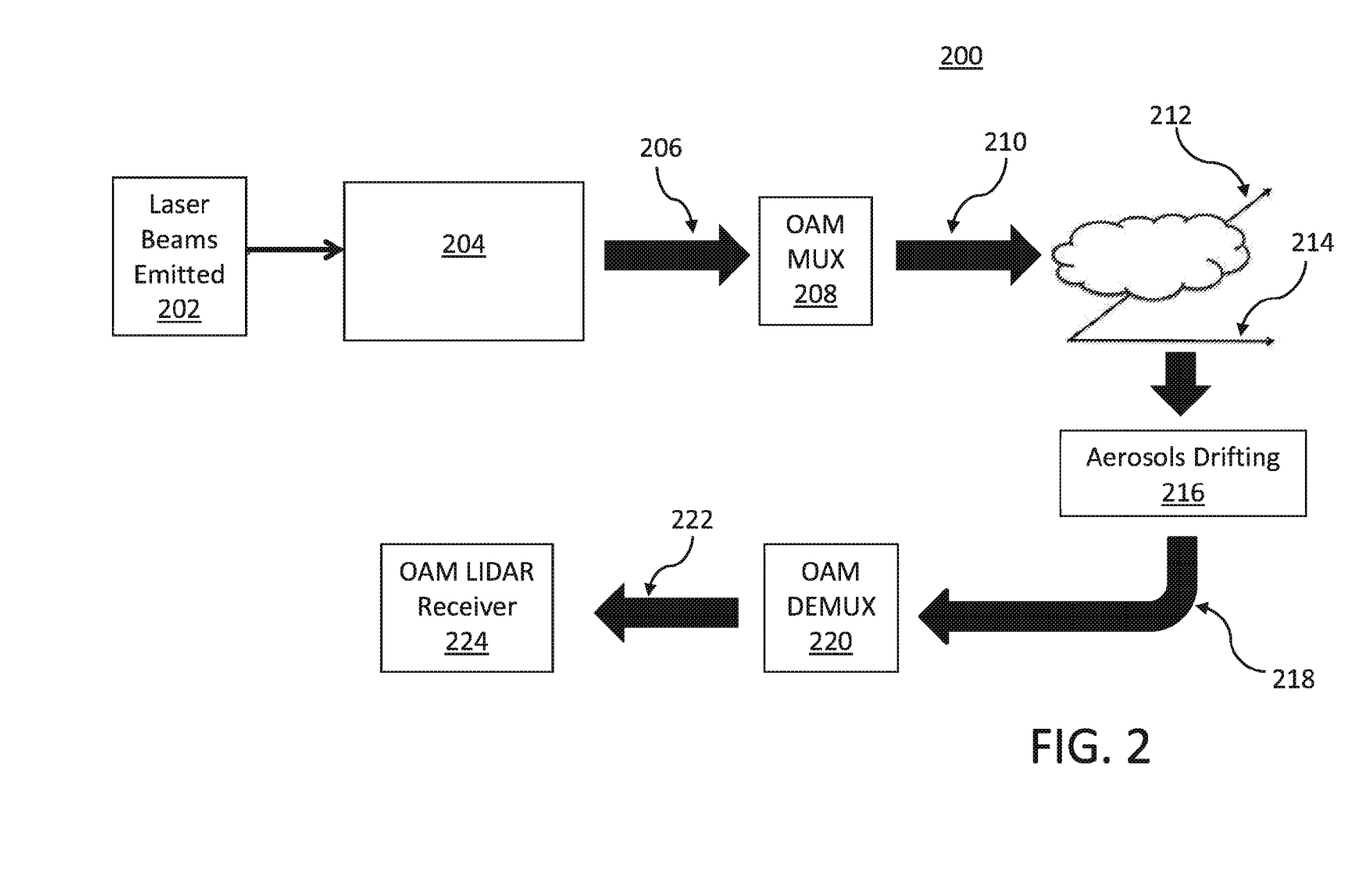
FIG. 2 shows an exemplary wind turbulence sensing system using Doppler Orbital Angular Momentum (OAM) Light Detection And Ranging (LIDAR), in accordance with an embodiment of the present principles.

Referring now to FIG. 2, an exemplary wind turbulence sensing system 200 using Doppler Orbital Angular Momentum (OAM) Light Detection and Ranging (LIDAR) is illustratively depicted in accordance with an embodiment of the present principles. It is noted that Light Detection and Ranging (LIDAR) is a remote sensing technique that operates via the transmission and detection of light in free-space, which offers the ability to determine wind speed and direction at substantial heights using a ground-based instrument.

Before describing the present principles in detail, a brief discussion regarding LIDAR is presented for ease of understanding various embodiments. LIDAR is a remote sensing technique that operates via the transmission and detection of light in free-space, which offers the ability to determine wind speed and direction at substantial heights using a ground-based instrument. A basic principle of LIDAR is to measure the Doppler shift of radiation scattered by natural aerosols carried by the wind. Conventional wind measurement LIDAR systems (e.g., mounted on an aircraft) still operate far from the maximum limit of sensitivity when measuring wind speed, and there are a great number of limitations placed on mounted instruments and resolution due to the aerodynamic and structural effects caused by cylindrical lens in conventional systems. Although the relative velocity of an object moving with respect to an observer can be readily determined by measuring the Doppler shift of light scatted from the object, no frequency shift can be seen for a wheel illuminated with a plane wave at the center of rotation.

There is therefore a need for a remote sensing technology that is high-performance, compact and robust, hence is capable of addressing the important aviation safety issues outlined above. In one embodiment, a Doppler orbital angular momentum (OAM) LIDAR remote wind sensing system 200 may be employed to resolve the above-mentioned problems according to the present principles. In one embodiment, light beams (e.g. CW beams, pulsed beams, laser beams, etc.) may be emitted from a light source 202 (e.g., laser beam), and a plurality of OAM modes/states 204 of the light (e.g., $l=-1, 1, 2, 3, 4$, etc.) from the light source 202 may be generated using, for example, a SPP (not shown) and transmitted in block 206 using, for example, a coherent OAM beam transmitter, to an OAM multiplexer 208 according to the present principles. In some embodiments, one or more remote sensing devices (e.g., LIDAR device) may be placed in a plurality of positions, including, for example, a wind field, on an airplane, etc. The OAM light 204 may encounter wind turbulence in block 210 when traveling through the atmosphere and degradation of the transmitted beams 204 may occur when passing through the atmosphere.

In one embodiment, wind speed/magnitude 212 along a line of sight 214 may be measured, and aerosols 216 drifting in the atmosphere may be employed to scatter some of the transmitted energy 204 (e.g., OAM light) from a light source 202 (e.g., coherent pulsed laser system), and the OAM beams 202 may be reflected in block 218, and may pass through an OAM demultiplexer 220. The Doppler shift 222 may be employed to measure the wind magnitude 212 along the line of sight 214, and the OAM beams 204 may be received by an OAM LIDAR receiver 224 according to the present principles.

In one embodiment, the OAM LIDAR receiver 224 may incorporate an OAM mode sorter, to measure change in laser frequency (Doppler shift) due to reflection off a moving object. The effects of wind turbulence 210 may result in the spatial profile change of the light incident on a detector, by the wheel with a beam carrying OAM where a frequency shift difference can be observed, causing considerable crosstalk between the measured OAM channels 204. The measurement of the turbulence quantities 212, 214 using the OAM LIDAR system 200 provides improved daytime performance (e.g., by the spatial coherency filtering of background light), and advantageously enables single scattering to be uniquely distinguished from multiple scattering in turbid environments utilizing different OAM modes according to the present principles.

In one embodiment, a significant advantage of employing the Doppler shift 222 is that path-resolved wind is easily obtained, and the OAM imaging and remote sensing may enable detection of the angular momentum, which reveals the structure and/or the motion of an object. OAM is a new, orthogonal, degree of processing freedom in addition to wavelength, phase, amplitude, polarization, which makes it capable of measuring three-dimensional wind turbulence. It can improve the sensitivity and extracting more information in comparison to conventional approaches.

The helical phase structure of beams carrying OAM 204 is a beneficial property in optical communications, quantum optics and even mid-infrared microscopy. As an unrecognized degree of freedom for light that can be readily controlled, manipulated, and detected in laser beams, OAM modes 204 are characterized by helical wave-fronts that rotate forward as vortex beams like a screw. The OAM LIDAR beams 204 may be detected to greater optical depth into turbid media such as dense clouds or coastal waters, because the bright haze of multiple scattering may be eliminated when remotely sensing air turbulence 210 (e.g., wind shear, clear air turbulence, etc.) according to various embodiments of the present principles.

In one embodiment, a coherent OAM beam transmitter 206 may be employed with a heterodyne OAM LIDAR receiver 224. Applications of OAM modes include particle manipulation, astronomy and optical communications, and the present principles advantageously employ OAM modes for use in an OAM LIDAR remote sensing system 200, according to the present principles. This new system and method according to the present principles has distinct advantages over conventional sensing (e.g., wind sensing) systems. For example, as transmitted light is scattered by natural aerosols 216 carried by the wind, the rotation rate of the aerosols may be measured by analyzing different frequency shifts in the OAM states 204 of the light.

In one embodiment, for beams with helical phase-fronts 204 (e.g., OAM vortex beams 204 with l=1, 2, 3), a rotation of angular frequency $\Omega$ between the source and observer may be determined to shift by:

$$\Delta f = \frac{\Omega(l+\sigma)}{2\pi},$$

where $l\hbar$ and $\sigma\hbar$ represent an azimuthal component and a spin angular momentum, and thus, $(l+\sigma)\hbar$ is the total angular momentum per photon.

In one embodiment, linear Doppler shift and Doppler velocimetry may be applied for remote measurement of transverse velocity according to the present principles, and the rotational or angular Doppler Effect may be employed to further improve the overall LIDAR performance of the system 200 to, for example, remotely and accurately predict wind turbulence according to the present principles. Furthermore, the optical LIDAR heterodyne detector/receiver 224 may employ multiple-input multiple-output (MIMO) and equalization techniques according to the present principles.

Figure 5:
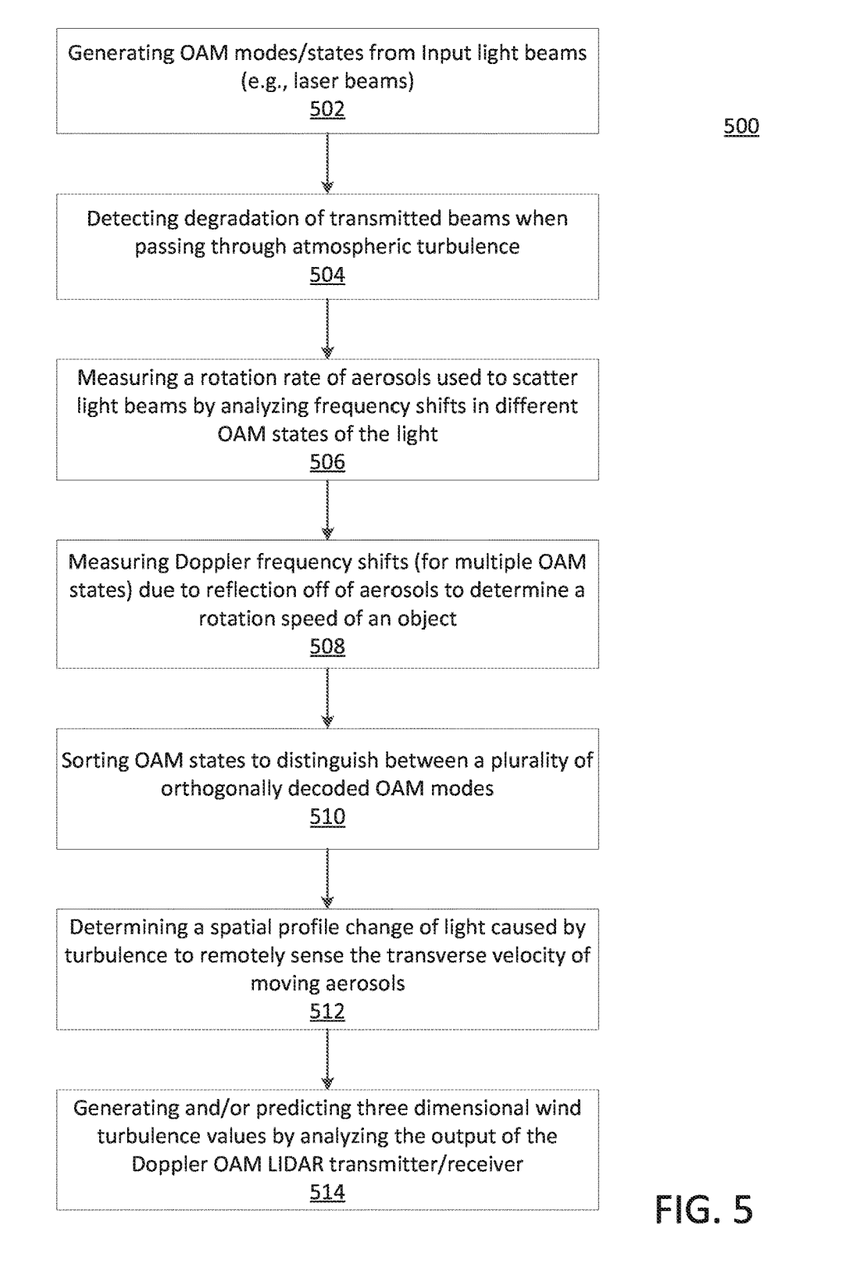
FIG. 5 shows an exemplary method for sensing wind turbulence using Doppler Orbital Angular Momentum (OAM) Light Detection And Ranging (LIDAR), in accordance with an embodiment of the present principles.

In one embodiment, the light beam may be transmitted by, for example, a light source device according to various embodiments, and may be directed towards the remote object, as shown in block 504. The light beam may include a laser beam and may intrinsically have angular momentum.

After applying the OAM states on the light beam 202 and transmitting the light beam 202, the light beam may be optionally transmitted through at least one of an imaging optics device and/or free-space channel component. For example, the imaging optics device may include a lens, a plurality of lenses arranged in a series, etc., which will be described in further detail herein below.

The light beam 202 may be projected on the remote object to reflect an optical OAM spectrum, which may be associated with the remote object. The reflected optical OAM spectrum may provide high resolution imaging information of the remote object. The reflected optical OAM spectrum may be measured to provide a high resolution image of the remote object, and the OAM spectrum may be measured to extract OAM coefficient values for each OAM mode according to the present principles. Furthermore, an image may be generated with high resolution structural properties of the remote object based on the extracted OAM coefficient values according to various embodiments using the Doppler OAM LIDAR system 200 according to the present principles.

In some embodiments, full information (e.g., including amplitude, phase, and polarization of different OAM components/modes) may be retrieved from incoming beams 202 using a sensor (e.g., mounted on the nose of an aircraft to detect rotation within the atmosphere), and may be processed using an analog-to-digital converter (ADC) and digital signal processing (DSP) manipulation. This extracted information may be remotely or locally analyzed (e.g., using an analysis device coupled to a processor) to predict atmospheric conditions (e.g., wind turbulence, wind shear, down burst, etc.), and the system 200 may generate and communicate early warnings to aircrafts (e.g., airplanes, helicopters, etc.) of potentially dangerous conditions, including, for example, high clear air turbulence and wind shear conditions based on the analysis according to various embodiments of the present principles, which will be described in further detail herein below.

Figure 3:
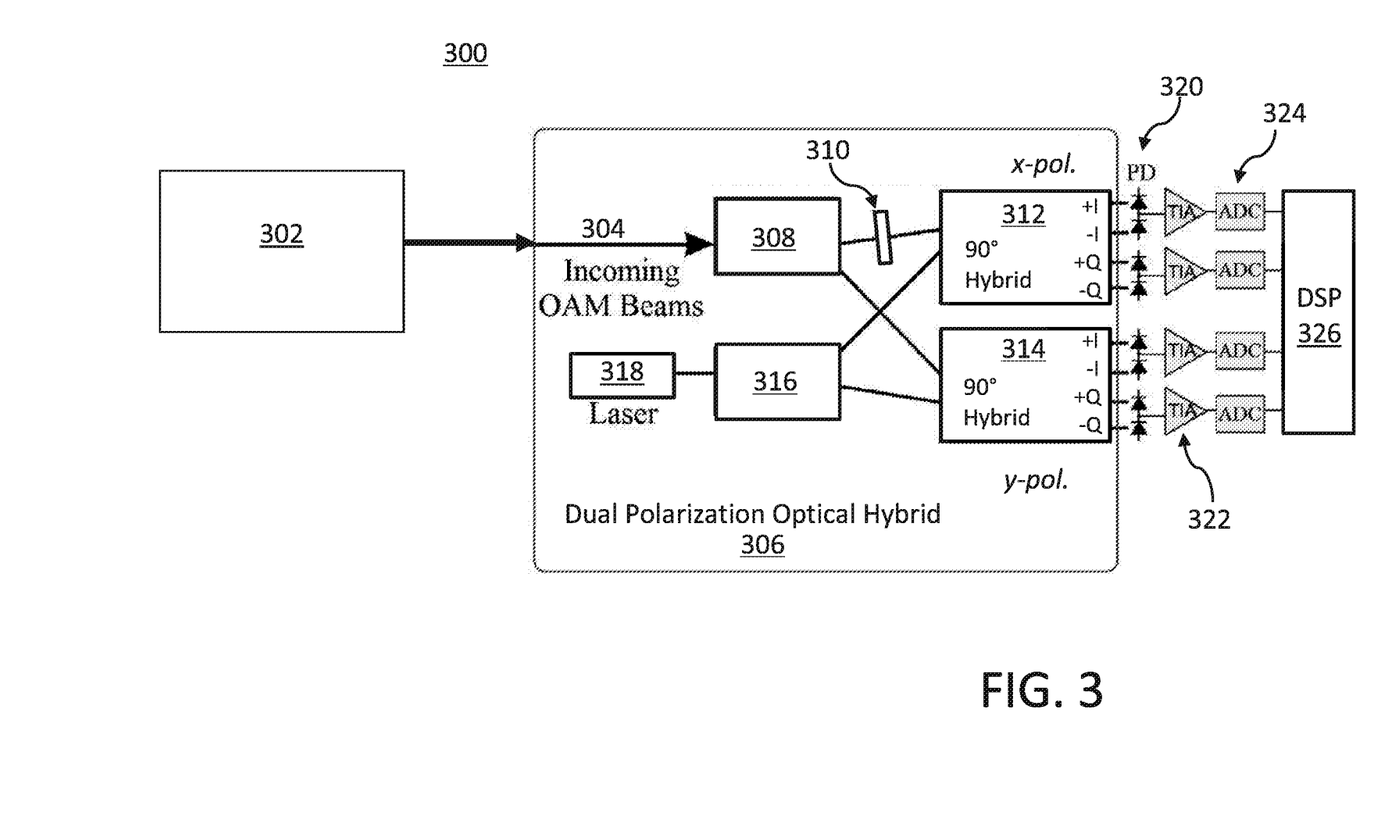
FIG. 3 shows an exemplary schematic of an Orbital Angular Momentum (OAM) Light Detection And Ranging (LIDAR) receiver, in accordance with an embodiment of the present principles.

Referring now to FIG. 3, an exemplary schematic of an Orbital Angular Momentum (OAM) Light Detection And Ranging (LIDAR) heterodyne receiver 300 is illustratively depicted in accordance with an embodiment of the present principles. In one embodiment, a transmitter (e.g., coherent OAM beam transmitter) (not shown) may send OAM beams 302 to the receiver 300, and may be sent along a path 304 which passes through a polarization splitter 308 for splitting the incoming beams 302 into beams of differing polarizations using a dual polarization optical hybrid 306 (DPOH) according to the present principles.

In one embodiment, one or more polarization rotators 310 may be integrated into the DPOH 306 to rotate the polarization axis of the received light beams 302 by an angle of choice (e.g., 90° angle). A Local Oscillator 318 (LO) may employ a laser to provide power, and a power splitter 316 may be employed to split power between the hybrid couplers 312, 314 according to the present principles. The LO 318 may be a reference LO, and may be set to a relatively close frequency to the incoming beams 304 to determine the difference frequency, which may carry the information (e.g., amplitude, phase, and frequency modulation) of an original signal/beam 304 (e.g., higher frequency signal), but may be oscillating at a lower carrier frequency.

In some embodiments, the LO 318 may employ a laser to provide additional power for heterodyne detection (e.g., coherent detection) of the receiver 300. The heterodyne signal resulting from a weak input signal can become much more powerful with a strong LO laser 318 applied than only for direct detection, and the present principles may be applied without any optical amplification involved throughout this process. In one embodiment, the local oscillator may employ one or more lasers that are sufficiently stable over periods of time long enough to average down the background noise, thus providing better performance than conventional detection systems by increasing the signal-to-noise ratio, which may be achieved by providing enhanced laser stability according to the present principles.

In some embodiments, optical heterodyne detection using the OAM LIDAR receiver system 300 has special temporal and spatial characteristics that pragmatically distinguish it from conventional Radio Frequency (RF) heterodyne detection. For example, electrical field oscillations in the optical frequency range cannot be directly measured since the relatively high optical frequencies have oscillating fields that are much faster than electronics can respond. Instead, optical photons may be detected by energy or equivalently by photon counting, which are proportional to the square of the electric field and thus form a non-linear event. Thus when the LO and the signal beams impinge together on the surface of a photodiode they "mix", producing heterodyne beat frequencies directly (e.g., via the physics of energy absorption).

In one embodiment, the rotated beams from the rotator 310 may be sent to one or more hybrid couplers 312, 314 (e.g., 90° hybrid couplers), and the signals (e.g., OAM modes) may then be sent to one or more photodiodes 320 (PD), one or more transimpedance amplifiers 322 (TIAs), one or more analog-to-digital converters (ADC), and a digital signal processor 326 to generate output.

For ease of illustration, in one exemplary embodiment, the receiver 300 may include an optical signal processing section 306 (e.g., DPOH) which may include a polarization beam splitter 308, a power splitter 316, and two 90° optical hybrid couplers 312, 314, which may be employed to separate paths according to the present principles. In one embodiment, the couplers 312, 314 may separate polarized light (e.g., from the polarization splitter 308) into phase components (e.g., In-phase/quadrature components), which may be converted into four high-speed differential electrical signals sent through eight PDs 320 and four TIAs 322 before being converted using four ADCs 324, and output after passing through a digital signal processor 326 according to the present principles. Although the above configuration is illustratively depicted, it is noted that other configurations and quantity of components are contemplated according to various embodiments of the present principles.

Figure 4:
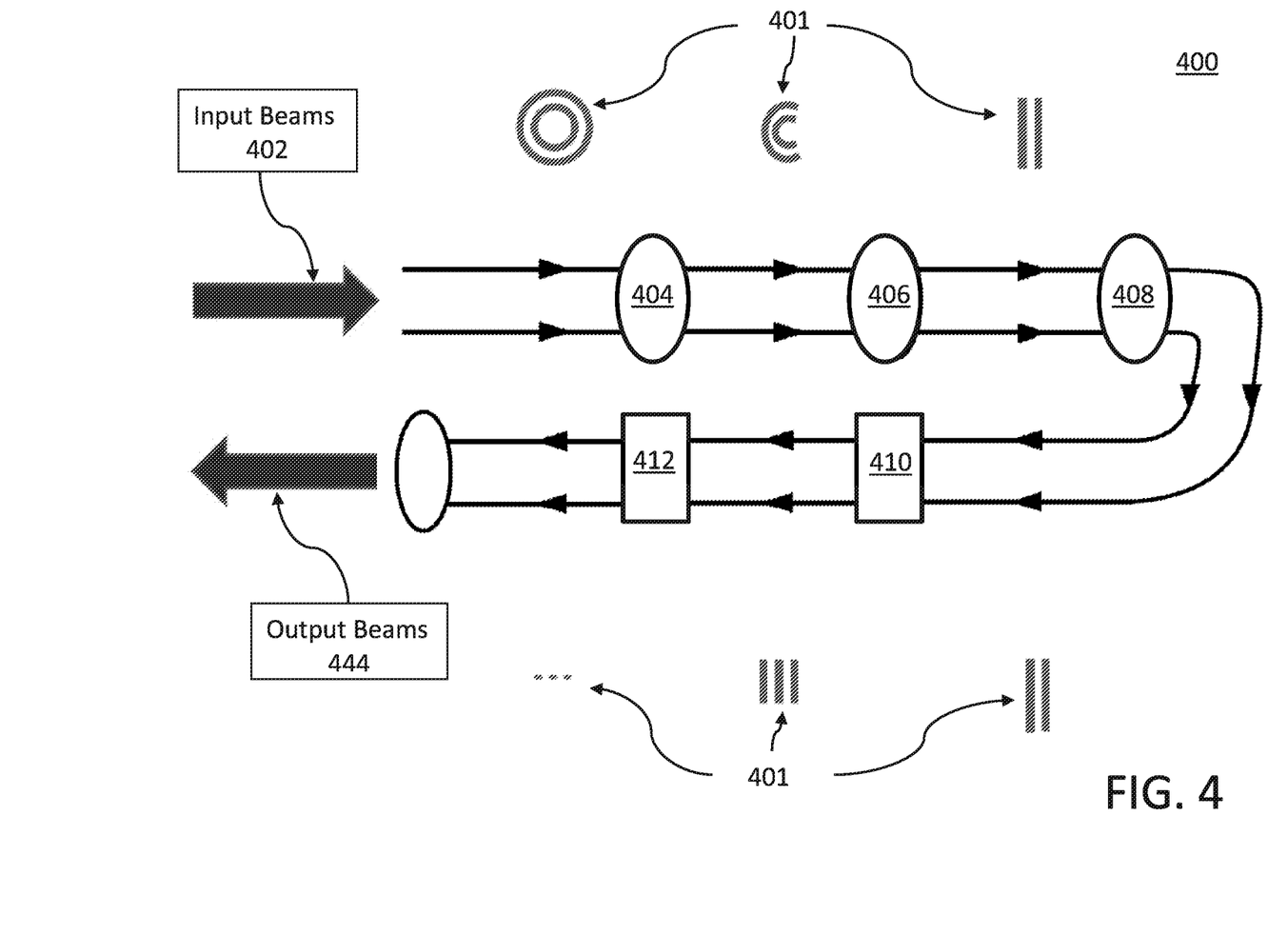
FIG. 4 shows an exemplary schematic of an Orbital Angular Momentum (OAM) sorter, in accordance with an embodiment of the present principles.

Referring now to FIG. 4, with continued reference to FIGS. 2 and 3, an exemplary schematic of an Orbital Angular Momentum (OAM) sorter 400 is illustratively depicted in accordance with an embodiment of the present principles. In one embodiment, the sorter 400 may be incorporated into a heterodyne receiver 300 to efficiently distinguish between OAM modes. For example, the input beams 402 may include a plurality of orthogonally decoded Laguerre-Gaussian (LG) modes, and the may receive input beams 402, which the remote sensing system 200 may employ for measuring three-dimensional (3D) wind turbulence according to the present principles.

In one embodiment, input beams 402, including a plurality of OAM/LG modes, may be unwrapped by an unwrapper 404, and various unwrapped OAM beam states are illustrated for simplicity in 401. A phase corrector 406, or other adaptive optical device, may be employed for phase correction (e.g., relative phase correction between OAM modes), and the unwrapped OAM beams may pass through a lens 408 to focus the beams on a desired object/location according to the present principles. The OAM mode sorter 400 sorts and detects LG modes based on their OAM state 401, and the input beams 402 may include generated photons which possess OAM in the form of LG laser modes according to various embodiments.

A spatial light modulator 410 (SLM) may be employed to generate multiple copies of the unwrapped beams, and phase distortions may be removed using a phase corrector 412 before beams are output in block 444. The sorter 400 may maximize the Fresnel number (and therefore OAM bandwidth) by distinguishing between a large number of OAM modes (e.g., more than 50), and the effective Fresnel number of the sensing system 300 may be set by the radius of the optics (e.g., lens 308) or the radius of the beams 402, 444 themselves according to the present principles.

In some embodiments, the OAM sorter 400 may serves as a significant part of the coherent receiver 300. The OAM multiplexer structure 208 may include a one or more OAM sorters 400, as well as a single-mode fiber-optic array (not shown). The number of OAM sorters 400 may depend on the actual number of OAM modes 204 to distinguish. Similarly to how the polarization splitter 300 may split the incoming beams into beams of differing polarizations, during OAM demultiplexing using, for example, an OAM demultiplexer 220, when the input OAM beam 402 is injected into the OAM mode sorter 400, the twisting phase fronts of OAM modes 401 may be converted into L-dependent spatial positions via a log-polar optical element transformation at its output.

In some embodiments, single-mode optical fiber array may be located at the OAM sorter output 444 to collect the separated OAM modes 401 from each L-dependent spot for coherent detection using the receiver 300, and therefore may function as a demultiplexer according to the present principles. The OAM demultiplexer may be considered as a computationally complex coherent-detection based implementation with MIMO digital signal processing (DSP) according to the present principles.

Referring now to FIG. 5, an exemplary method 500 for sensing wind turbulence using Doppler Orbital Angular Momentum (OAM) Light Detection And Ranging (LIDAR) is illustratively depicted in accordance with an embodiment of the present principles. In block 502, a plurality of OAM modes/states may be generated from input light beams (e.g., laser beams), and may be transmitted through the atmosphere toward an object (e.g., moving object).

In one embodiment, as light is scattered from a rotating (e.g., spinning object), the degradation of the transmitted beam as it passes through atmospheric turbulence may be detected and measured in block 504. In block 506, a rotation rate of aerosols used to scatter light beams may be measured by analyzing frequency shifts in different OAM states of the light. In block 508, a LIDAR receiver may measure the Doppler frequency shifts due to the reflection of the OAM light off aerosols, thereby providing full information of the rotation speed and other properties of the object of interest.

In one embodiment, in block 510, OAM states/modes may be sorted to distinguish between a plurality of orthogonally decoded OAM modes. In block 512, a spatial profile change of light may be determined, and the effects of wind turbulence may result in the spatial profile change of the light incident to the detector, which may be used to remote sensing of the transverse velocity of moving aerosols according to the present principles. The receiver may further be employed for multi-parameter sensing with signals from each mode which are encoded and multiplexed at different positions in the wavelength domain, and three dimensional wind turbulence values may be generated and/or predicted in block 514 by analyzing the output of the Doppler OA LIDAR transmitter and receiver according to various embodiments of the present principles.

Figure 6:
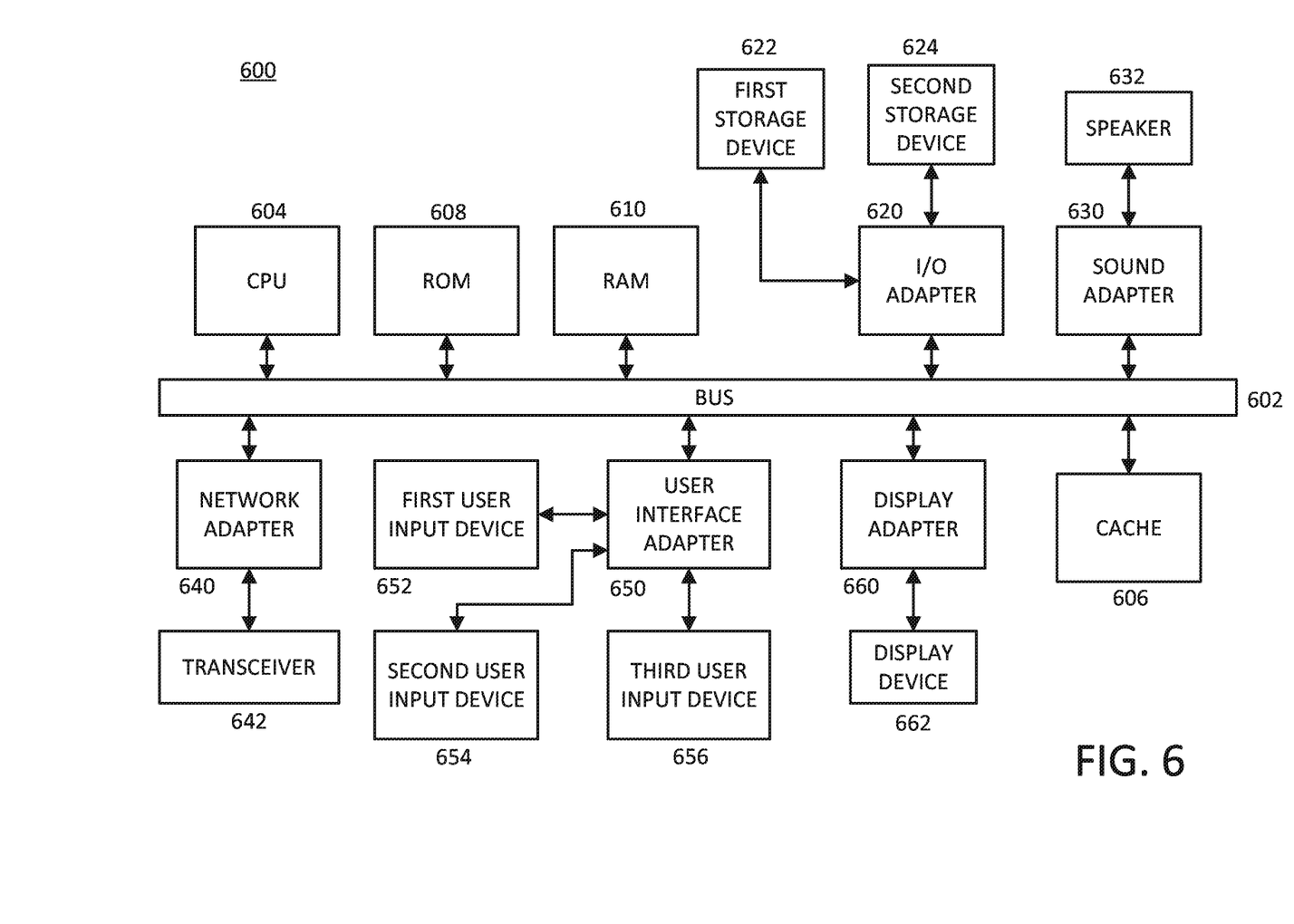
FIG. 6 shows an exemplary processing system to which the present principles may be applied, in accordance with an embodiment of the present principles.

Referring now to FIG. 6, an exemplary processing system 600, to which the present principles may be applied, is illustratively depicted in accordance with an embodiment of the present principles. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
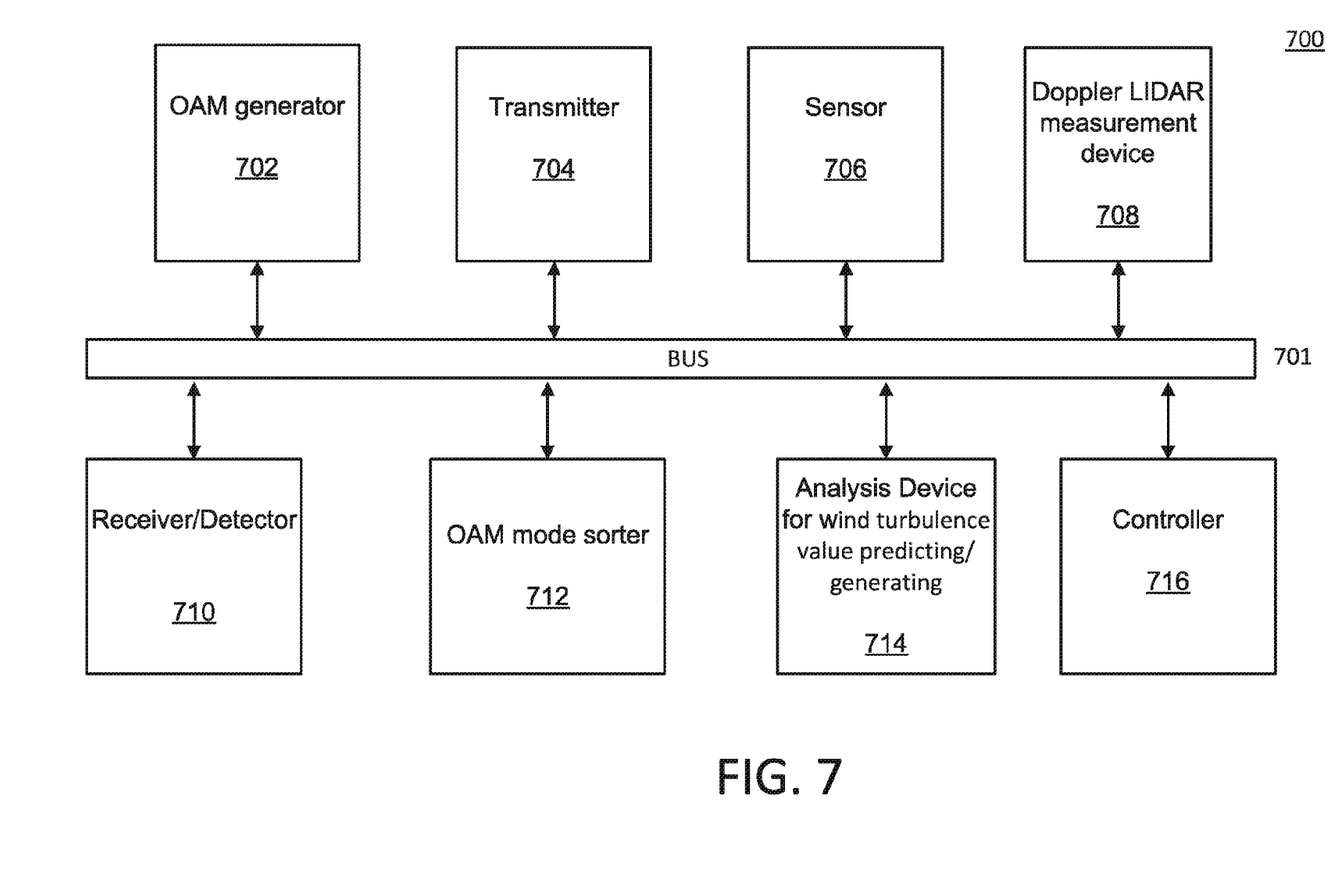
FIG. 7 shows an exemplary system for controlling a wind turbulence sensing system using Doppler Orbital Angular Momentum (OAM) Light Detection And Ranging (LIDAR), in accordance with an embodiment of the present principles.

Moreover, it is to be appreciated that system 700 described below with respect to FIG. 7, is a system for implementing respective embodiments of the present principles. Part or all of processing system 600 may be implemented in one or more of the elements of system 700.

Further, it is to be appreciated that processing system 600 may perform at least part of the method described herein including, for example, at least part of method 500 of FIG. 5. Similarly, part or all of system 700 may be used to perform at least part of method 500 of FIG. 5.

Referring now to FIG. 7, an exemplary system 700 for controlling a Doppler Orbital Angular Momentum (OAM) Light Detection And Ranging (LIDAR) wind turbulence sensing system is illustratively depicted in accordance with an embodiment of the present principles. While many aspects of system 700 are described in singular form for the sakes of illustration and clarity, the same can be applied to multiples ones of the items mentioned with respect to the description of system 700. For example, while a single sensor 706 is described, more than one sensor 706 can be used in accordance with the teachings of the present principles, while maintaining the spirit of the present principles. Moreover, it is appreciated that the sensor 706 is but one aspect involved with system 700 than can be extended to plural form while maintaining the spirit of the present principles.

In one embodiment, an OAM generator 702 may generate OAM modes from a light beam (e.g., laser beam) using, for example, a spiral phase plate of inhomogeneous thickness) before transmitting the OAM beams toward an object of interest using a transmitter 704. In some embodiments, CW or pulsed beams may be used as the transmitter source for the laser beam, enhancing portability and reliability.

In one embodiment, one or more sensors 706 may be deployed (e.g., on an aircraft, in a wind field, etc.) to detect atmospheric conditions, and a Doppler OAM LIDAR measurement device 708 may be employed to obtain path resolved wind measurements to be used to, for example, provide early warnings of clear air turbulence or wind shear according to the present principles. Since the Doppler-shifted frequency is directly proportional to line-of-sight velocity, the wind speeds obtained by a Doppler OAM LIDAR instrument may not to need calibration according to various embodiments.

In one embodiment, a receiver/detector 710 may be an optical heterodyne detector, and may provide better penetration of smoke, dust and fog than a visible laser, in addition to more stable output power and lower beam pointing jitter in comparison to conventional systems. The receiver may further include an OAM mode sorter 712 configured to sort a plurality of OAM modes/states of light according to the present principles. In some embodiments, the receiver may be ground installed (e.g., at an airport), and may determine temperature gradient changes and wind shear along the paths of approaching or departing aircraft according to the present principles. As such, various embodiments of the present principles may employ the OAM LIDAR wind turbulence measurement system in multiple regimes (e.g., aircraft safety, military helicopters, airport ground security, etc.).

In one embodiment, an analysis device 714 may be employed to predict and/or generate three dimensional wind turbulence values. The analysis may further provide improved daytime performance by the spatial coherency filtering of background light, and allow single scattering to be uniquely distinguished from multiple scattering in turbid environments utilizing different OAM modes according to the present principles. A controller 716 may be remote to the transmitter 704, sensors 706, receiver 710, etc., or may be incorporated into any other components according to various embodiments, and may be employed to control operations of the system according to the present principles.

In the embodiment shown in FIG. 8, the elements thereof are interconnected by a bus 701. However, in other embodiments, other types of connections can also be used. Moreover, in an embodiment, at least one of the elements of system 700 is processor-based and/or a logic circuit. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 700 are readily determined by one of ordinary skill in the art, given the teachings of the present principles provided herein, while maintaining the spirit of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A transmitter using optical orbital angular momentum (OAM)-based spectroscopy for detection of atmospheric conditions, comprising:
   at least one OAM generator configured to apply at least one OAM state on a light beam to generate an optical OAM spectrum including a plurality of OAM states;
   a transmitting device configured to send one or more generated OAM light beams into an atmosphere; and
   one or more measurement devices configured to:
      determine degradation of the generated OAM light beams when passing through atmospheric turbulence; and
      determine a rotation rate of aerosols in the atmosphere by analyzing different frequency shifts in the plurality of OAM states.

2. The transmitter as recited in claim 1, wherein the OAM spectrum is generated by crossing a spiral phase plate with the light beam.

3. The transmitter as recited in claim 1, wherein the light beam is a Light Detection and Ranging (LIDAR) beam.

4. The transmitter as recited in claim 1, further comprising an OAM multiplexer configured distinguish between a plurality of different orthogonal signals based on an orbital angular momentum of the OAM spectrum.

5. The transmitter as recited in claim 1, wherein the OAM light beams are vortex beams with helical phase-fronts.

6. The transmitter as recited in claim 1, wherein the at least one OAM generator is further configured to measure a set of OAM modes associated with a reflected optical OAM spectrum of the remote object.

7. A receiver using optical orbital angular momentum (OAM)-based spectroscopy for detection of atmospheric conditions, comprising:
   a measurement device for determining Doppler frequency shifts caused by reflection off aerosols in an atmosphere for a plurality of received light beams with OAM states;
   an OAM sorter to detect and sort a plurality of orthogonally decoded Laguerre-Gaussian (LG) modes of the plurality of received light beams based on the OAM states of the LG modes;
   an analysis device for generating predictions of three-dimensional wind turbulence values by analyzing a difference in the Doppler frequency shifts for the plurality of received light beams with OAM states.

8. The receiver as recited in claim 7, wherein the plurality of received light beams are Light Detection and Ranging (LIDAR) beams.

9. The receiver as recited in claim 7, wherein the predicted three-dimensional wind turbulence values are employed to predict wind shear, down burst, and clear air turbulence.

10. The receiver as recited in claim 7, further comprising determining a spatial profile change of the received light beams caused by wind turbulence to remotely sense a transverse velocity of the aerosols.

11. The receiver as recited in claim 7, wherein the receiver is a heterodyne receiver.

12. The receiver as recited in claim 7, wherein the Doppler frequency shifts are directly proportional to a line-of-sight velocity of wind.

13. The receiver as recited in claim 7, wherein the receiver is further configured to distinguish single scattering from multiple scattering in turbid environments utilizing different OAM states by spatial coherency filtering of background light.

14. A method for using optical orbital angular momentum (OAM)-based spectroscopy for detection of atmospheric conditions, comprising:
   applying at least one OAM state on a light beam to generate an optical OAM spectrum;
   transmitting one or more generated OAM light beams into an atmosphere;
   determining degradation of the generated OAM light beams when passing through atmospheric turbulence;
   determining a rotation rate of aerosols in the atmosphere by analyzing different frequency shifts in a plurality of OAM states of the generated OAM light beams;
   receiving a reflected OAM spectrum including a plurality of OAM light beams associated with the aerosols in the atmosphere;
   measuring Doppler frequency shifts caused by reflection off the aerosols in the atmosphere for each of the generated OAM light beams in the OAM spectrum;
   detecting and sorting a plurality of orthogonally decoded Laguerre-Gaussian (LG) modes of a plurality of received light beams based on the OAM states of the LG modes; and
   predicting three-dimensional wind turbulence values by analyzing a difference in the Doppler frequency shifts for the plurality of received OAM light beams.

15. The method as recited in claim 14, wherein the plurality of received light beams are Light Detection and Ranging (LIDAR) beams.

16. The method as recited in claim 14, further comprising determining a spatial profile change of the plurality of received light beams caused by wind turbulence to remotely sense a transverse velocity of the aerosols.

17. The method as recited in claim 14, wherein the optical OAM spectrum is generated by crossing a spiral phase plate with the light beam.

18. The method as recited in claim 14, further comprising distinguishing between a plurality of different orthogonal signals based on an orbital angular momentum of the optical OAM spectrum.

19. The method as recited in claim 14, wherein the plurality of OAM light beams are vortex beams with helical phase-fronts.

20. The method as recited in claim 14, further comprising predicting wind shear, down burst, and clear air turbulence using the predicted three-dimensional wind turbulence values.

* * * * *